United States Patent
Jaber et al.

(10) Patent No.: US 11,413,586 B2
(45) Date of Patent: Aug. 16, 2022

(54) POLYAMIDE COATED FILTER MEMBRANE, FILTERS, AND METHODS

(71) Applicant: ENTEGRIS, INC., Billerica, MA (US)

(72) Inventors: Jad Ali Jaber, Westford, MA (US); Kwok-Shun Cheng, Nashua, NH (US); Saksatha Ly, Lexington, MA (US)

(73) Assignee: ENTEGRIS, INC., Billerica, MA (US)

( * ) Notice: Subject to any disclaimer, the term of this patent is extended or adjusted under 35 U.S.C. 154(b) by 14 days.

(21) Appl. No.: 16/381,442

(22) Filed: Apr. 11, 2019

(65) Prior Publication Data

US 2019/0329185 A1    Oct. 31, 2019

Related U.S. Application Data

(60) Provisional application No. 62/664,515, filed on Apr. 30, 2018.

(51) Int. Cl.
| | | |
|---|---|---|
| *B01D 69/12* | (2006.01) | |
| *B01D 69/02* | (2006.01) | |
| *B01D 67/00* | (2006.01) | |
| *B01D 71/56* | (2006.01) | |
| *B01D 71/26* | (2006.01) | |

(52) U.S. Cl.
CPC ....... *B01D 69/125* (2013.01); *B01D 67/0006* (2013.01); *B01D 69/02* (2013.01); *B01D 71/26* (2013.01); *B01D 71/56* (2013.01); *B01D 2323/30* (2013.01); *B01D 2325/02* (2013.01); *B01D 2325/04* (2013.01)

(58) Field of Classification Search
CPC .. B01D 69/125; B01D 69/02; B01D 67/0006; B01D 71/56; B01D 71/26; B01D 69/12
See application file for complete search history.

(56) References Cited

U.S. PATENT DOCUMENTS

| | | | | |
|---|---|---|---|---|
| 4,702,840 | A | * | 10/1987 | Degen ................ B01D 67/0011 |
| | | | | 210/490 |
| 5,411,663 | A | | 5/1995 | Johnson |
| 5,695,640 | A | * | 12/1997 | Tseng ......................... C08J 9/40 |
| | | | | 210/500.38 |
| 5,814,372 | A | * | 9/1998 | Moya ................. B01D 67/0088 |
| | | | | 427/373 |
| 6,291,543 | B1 | | 9/2001 | Shah |
| 6,679,991 | B1 | * | 1/2004 | Van Andel .......... B01D 61/362 |
| | | | | 210/321.6 |
| 9,457,322 | B2 | | 10/2016 | Choi |
| 2009/0247690 | A1 | | 10/2009 | Kay |

(Continued)

FOREIGN PATENT DOCUMENTS

| | | |
|---|---|---|
| CN | 1158274 A | 9/1997 |
| CN | 1328483 A | 12/2001 |

(Continued)

OTHER PUBLICATIONS

Meier-Haack, Jochen et al., "Microporous membranes from polyolefin-polyamide blend materials," Desalination, 2004, vol. 163, Issue 1-3, pp. 215-221.

(Continued)

*Primary Examiner* — Krishnan S Menon

(57) ABSTRACT

Described are filter membranes coated with a polyamide, filters and filter cartridges that include the filter membranes, and methods of using and making the filter membranes.

25 Claims, 5 Drawing Sheets

(56) References Cited

U.S. PATENT DOCUMENTS

| | | | |
|---|---|---|---|
| 2010/0230351 A1 | 9/2010 | Hoving | |
| 2011/0009819 A1 | 1/2011 | Lorenz | |
| 2012/0031842 A1* | 2/2012 | Freger | B01D 69/125 |
| | | | 210/650 |
| 2013/0000682 A1 | 1/2013 | Dekraker | |
| 2014/0061114 A1 | 3/2014 | Ramirez | |
| 2014/0339152 A1* | 11/2014 | Okabe | B05D 1/34 |
| | | | 210/488 |

FOREIGN PATENT DOCUMENTS

| | | |
|---|---|---|
| CN | 101121100 A | 2/2008 |
| CN | 101862604 A | 10/2010 |
| CN | 102210986 A | 10/2011 |
| CN | 102702542 B | 7/2013 |
| CN | 104607074 A | 5/2015 |
| CN | 107174971 A | 9/2017 |
| CN | 210495957 U | 5/2020 |
| DE | 3327638 C2 | 8/1986 |
| JP | 6099314 A | 6/1985 |
| JP | 02126925 A | 5/1990 |
| JP | 07238181 A | 9/1995 |
| JP | 2003200026 A | 7/2003 |
| JP | 2017213500 A | 12/2017 |
| KR | 19980020428 A | 6/1998 |
| KR | 19980068295 A | 10/1998 |
| KR | 20130079840 A | 7/2013 |
| KR | 20140042811 A | 4/2014 |
| KR | 101737092 B1 | 5/2017 |
| WO | 2004009201 A3 | 9/2004 |
| WO | 2005072487 A2 | 8/2005 |
| WO | 2011151314 A1 | 12/2011 |
| WO | 2016081729 A1 | 5/2016 |
| WO | 2017205722 A1 | 11/2017 |

OTHER PUBLICATIONS

Firouzi, D. et al; "Nylon-Coated Ultra High Molecular Weight Polyethylene Fabric for Enhanced Penetration Resistance"; Journal of Applied Polymer Science; pp. 1-9, 2014.

Ultramid 1C: The Solyble Polyamid, Physical Properties Handout/Information Sheet; BSAF Plastics; Apr. 2010.

Ultramid Product Information Sheet; BASF SE; pp. 1-2; 2017.

Umeda, T., et al.; "Metal reduction at bulk chemical filtration"; Society of Photo-Optical Instrumentation Engineers; pp. 1-8; 2017.

\* cited by examiner

POLYAMIDE COATED FILTER MEMBRANE, FILTERS, AND METHODS

This application claims the benefit of U.S. Application No. 62/664,515 filed on Apr. 30, 2018, which is hereby incorporated by reference in its entirety.

FIELD OF THE INVENTION

The following description relates to filter membranes that include a porous polymeric filter layer that is coated with a layer that contains cross-linked polyamide polymer; to methods of making the coated filter membranes, filter components, and filters; and method of using a coated filter membrane, filter component, or filter, to filter a fluid such as a liquid chemical to remove unwanted material from the fluid.

BACKGROUND

Filter membranes and filter products are indispensable tools of modern industry, used to remove unwanted materials from a flow of a useful fluid. Useful fluids that are processed using filters include water, liquid industrial solvents and processing fluids, industrial gases used for manufacturing or processing (e.g., in semiconductor fabrication), and liquids that have medical or pharmaceutical uses. Unwanted materials that are removed from fluids include impurities and contaminants such as particles, microorganisms, and dissolved chemical species. Specific examples of filter applications include their use to remove particles and bacteria from therapeutic solutions in the pharmaceutical industry, to process ultrapure aqueous and organic solvent solutions for use in microelectronics and semiconductor processing, and for water purification processes.

To perform a filtration function, a filter product includes a filter membrane that is responsible for removing the unwanted material. The filter membrane may, as required, be in the form of a flat sheet, which may be wound (e.g., spirally), or pleated, etc. The filter membrane may alternatively be in the form of hollow fibers. The filter membrane can be contained within a housing so that fluid that is being filtered enters through a filter inlet and is required to pass through the filter membrane before passing through a filter outlet.

Filter membranes can be constructed of porous structures that have average pore sizes that can be selected based on the use of the filter, i.e., the type of filtration performed by the filter. Typical pore sizes are in the micron or sub-micron range, such as from about 0.001 micron to about 10 microns. Membranes with average pore size of from about 0.001 to about 0.05 micron are generally classified as ultrafilter membranes. Membranes with pore sizes between about 0.05 and 10 microns are generally classified as microporous membranes.

Porous polymeric films are a common type of filter membrane, including those made of various fluoropolymers, polyolefins, and nylon materials such as nylon 6 and nylon 66. Nylon filters are used commercially for filtering solvent materials for photolithography methods for semiconductor fabrication. These methods require solvents that have a very high level of purity, and, therefore must be filtered using a filtration system of very high effectiveness. Filters made of nylon can be prepared with controlled small pore sizes that can be effective for these applications. However, liquids used in microelectronic and semiconductor processing can be acidic. And some nylons are polymerized using a metal catalyst such as magnesium. Exposing that type of nylon of a filter membrane to an acidic liquid can tend to cause the metal (e.g., magnesium) to be extracted from the nylon into the acidic fluid that is being filtered, where the metal is considered a contaminant. Moreover, nylons, being designed for inertness and solvent resistance, are not always soluble in a large selection of solvents. This reduces options for preparing a nylon filter membrane or filter membrane coating. For these reasons at least, ongoing need exists in the filtration arts for new and improved filters, including filters that contain nylons.

SUMMARY

The field of microelectronic device processing requires steady improvements in processing materials and methods to sustain parallel steady improvements in the performance (e.g., speed and reliability) of microelectronic devices. Opportunities to improve microelectronic device fabrication exist in all aspects of the manufacturing process, including methods and systems for filtering liquid materials.

A large range of different types of liquid materials are used as process solvents, cleaning agents, and other processing solutions, in microelectronic device processing. Many if not most of these materials are used at a very high level of purity. As an example, liquid materials (e.g., solvents) used in photolithography processing of microelectronic devices must be of very high purity. Specific examples of liquids that are used in microelectronic device processing include process solutions for spin-on-glass (SOG) techniques, for backside anti-reflective coating (BARC) methods, and for photolithography. Some of these liquid materials are acidic. To provide these liquid materials at a high level of purity for use in microelectronic device processing, a filtering system must be highly effective to remove various contaminants and impurities from the liquid, and must be stable (i.e., not degrade or introduce contaminants) in the presence of the liquid material being filtered (e.g., an acidic material).

Many important considerations factor into the ability to provide filter systems of ever-increasing effectiveness in challenging applications such as for microelectronics processing. Nylon materials (generically, polyamides) have been used as porous filter membranes, as coatings on a porous filter membrane, or both. Nylons have been used in these filter membranes for filtering various liquid materials involved in microelectronic device fabrication, but without improvements become ineffective or sub-optimal as microelectronic device processing methods continue to advance.

As an example, metal ions are used as a catalyst in preparing certain types of nylon materials and can be present in very low amounts in finished nylon filter materials. Even such a low level of metal in a nylon filter can be a problem for use of the filter in microelectronic device processing, because the metal may be extracted from the nylon filter material by acidic liquids. The extracted metal becomes a contaminant in the liquid. Separately, nylons vary in their ability to be processed into a filter membrane. Nylons are designed to be stable and resistant to chemicals, meaning that nylons may not be soluble in a large range of solvents. Some nylons are soluble in certain types of solvents such as acid solvents (e.g. formic acid) and ionic solvents (e.g., calcium chloride). But these solvents possess their own shortcomings: formic acid can be difficult to work with, and calcium chloride can leave impurities on a nylon coating in an amount that is not acceptable for use of the nylon as a filter for advanced node microelectronic device processing.

As described herein, Applicant has determined that certain types of polyamides can be effectively coated onto a porous polymeric filter layer to produce a coated filter membrane that exhibits useful or advantageous filtration performance in filtering contaminants or impurities from a liquid fluid. For example, the coated filter membrane can be used to remove contaminants from liquid materials used in microelectronic device processing, including acidic liquids, to produce a filtered liquid material having a very high level of purity.

A purity level of a processed liquid, and the related performance of a filter membrane, can be measured using a variety of different techniques. By one quantitative measure the effectiveness of a filter medium can be assessed by testing the effectiveness of the filter medium for removing a known type and amount of a material, e.g., a "challenge" material, which may be a dissolved metal or a metal particle such as gold. Coated filter membranes of the present description can be highly effective in removing these types of challenge particles, e.g., at least as effective as current or previous filter membranes based on these tests.

By another measure, the effectiveness of a filter membrane may be measured in terms of performance in a specific application, such as for filtering a fluid used for processing a microelectronic or semiconductor device, with the effectiveness of the filter membrane being measured in terms of performance, such as by measuring the level of defects present in a microelectronic or semiconductor device prepared using the fluid. As one example, effectiveness of a filter membrane can be assessed by counting the number of defects, e.g., "bridge defects," that are present in a microelectronic or semiconductor device prepared by using a liquid process solution that is processed (i.e., filtered) using the filter membrane. Fewer defects in the device indicate a higher level of effectiveness of the filter membrane.

A polyamide can be coated from solvent onto the filter layer using solvent that is different from formic acid and different from calcium chloride, each of which is not optimal for use in processing a nylon coating for a filter for use in microelectronic device processing. The solvent (that is not formic acid or calcium chloride) may be one that is non-acidic, non-ionic, and that can preferably be handled and processed by conventional methods. Propanol, which is commonly and routinely handled in industrial applications, is one example of a solvent that can be used to dissolve example polyamides as described. Propanol is non-acidic and does not introduce a level of contaminants into a coated polyamide that would prevent the polyamide from being useful for microelectronic device applications.

The polyamide can be coated by any useful methods, such as by an immersion precipitation method, and can be crosslinked after coating to increase the solvent resistance of the polyamide.

In one aspect, the invention relates to a coated filter membrane that includes: a porous polymeric filter layer, and non-porous crosslinked polyamide film coating at a surface of the porous filter layer.

In another aspect, the invention relates to a method of preparing a coated filter membrane. The method includes: coating polymer solution onto a surface of a porous filter membrane, the polymer solution comprising: polyamide polymer, solvent, and free-radical source material; causing polyamide of the polymer solution to coagulate on the surface; and crosslinking the polyamide.

DETAILED DESCRIPTION

Figure 1:
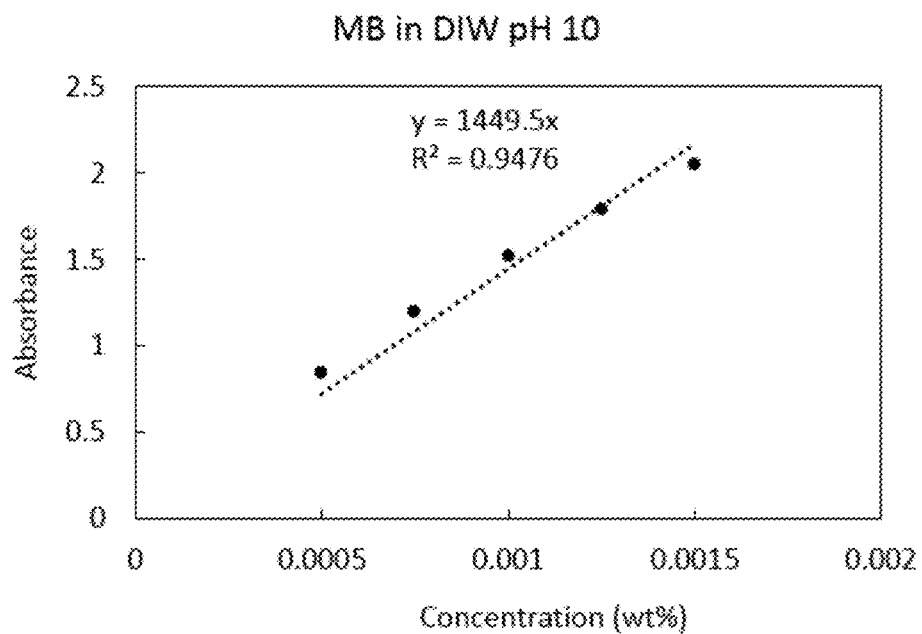
FIGS. 1, 2, 3, and 4 are graphs showing dye-binding capacity of various filter membranes.

The following description relates to coated filter membranes, methods of making coated filter membranes, products such as filter components and filters that contain a coated filter membrane, and methods of using a coated filter membrane, filter component, or filter.

A coated filter membrane as described includes a porous polymeric filter layer and a polymer film coating at one or more surfaces of the porous polymeric filter layer. The polymer film coating is a film coating that includes crosslinked polyamide polymer. The polyamide, before being crosslinked, can be dissolved in at least one type of solvent that is different from formic acid and calcium chloride, which are sometimes used for forming solutions from nylons but which can be difficult to handle (formic acid) or may produce an unacceptable level of residue or contamination (calcium chloride) when the resultant nylon is used in a filter for microelectronic device processing. In some embodiments, the polymer film coating can be porous and in other embodiments the polymer film coating can be non-porous.

The polyamide film coating can be a continuous or semi-continuous layer of polyamide-containing film disposed on surfaces of the porous polymeric filter layer. As a "film," a preferred coating is considered to be substantially thin. In some embodiments, the polyamide can be porous and in other embodiments the polyamide film can be non-porous or substantially non-porous (e.g., does not contain a substantial amount of void spaces). The film may be continuous over an entire portion of a surface or surfaces of a porous polymeric film layer, or may be semi-continuous, meaning that the film may be interrupted but may cover a substantial portion of the porous polymeric film layer.

The polymer film coating that contains crosslinked polyamide can be prepared by preparing a polymer solution that includes polyamide polymer (that is not crosslinked), placing the polymer solution onto surfaces of the porous polymeric filter layer, and crosslinking the polyamide. The polymer solution may be placed onto the surfaces of the polymeric filter layer in a manner that is effective to place a desired and useful amount of the polyamide at external and internal surfaces of the porous polymeric filter layer, for example by precipitation coating. The polyamide polymer may then be crosslinked by any effective method. The crosslinked polyamide can be dried so that a continuous or semi-continuous, porous or non-porous film coating remains on surfaces of the filter layer, with the film coating containing (comprising, consisting of, or consisting essentially of) the crosslinked polyamide polymer. The film coating will be present in a significant portion at inner surfaces of the pores of the porous polymeric filter layer, and can also be present on the outer (macroscopic) surface of the porous polymeric filter layer.

The film coating may contain materials other than the crosslinked polyamide, but useful and preferred examples of film coatings do not require any other materials. A film coating that includes polyamide as described, after being applied, crosslinked, and dried, can contain at least 50, 70, 85, 90, or 95 weight percent of the crosslinked polyamide based on total weight of the dried film coating. A film coating that consists essentially of the crosslinked polyamide coating is a film coating that contains not more than 5, 2, 1, or 0.5, weight percent of materials other than the crosslinked polyamide.

The coated filter membrane can be useful for filtering a liquid to remove undesired material (e.g., contaminants or impurities) from the liquid to produce a high purity liquid that can be used as a material of an industrial process. The industrial process may be any that requires a high purity liquid material as an input, with non-limiting examples of such processes including processes of preparing microelectronic or semiconductor devices, a specific example of which is a method of filtering a liquid process material (e.g., solvent or solvent-containing liquid) used for semiconductor photolithography. Examples of contaminants present in a process liquid or solvent used for preparing microelectronic or semiconductor devices may include metal ions dissolved in the liquid, solid particulates suspended in the liquid, and gelled or coagulated materials (e.g., generated during photolithography) present in the liquid.

The coated filter membrane can be useful to remove a dissolved or suspended contaminant or impurity (or the like) from a liquid that is caused to flow through the coated filter membrane, either by a sieving mechanism or a non-sieving mechanism, and preferably by both a combined non-sieving and a sieving mechanism. A sieving mechanism is a mode of filtration by which a particle is removed from a flow of liquid by mechanical retention of the particle at a surface of a filter membrane, which acts to mechanically interfere with the movement of the particle and retain the particle within the filter, mechanically preventing flow of the particle through the filter. Typically, the particle can be larger than pores of the filter. A "non-sieving" filtration mechanism is a mode of filtration by which a filter membrane retains a suspended particle or dissolved material contained in a liquid flowing through the filter membrane in a manner that is not exclusively mechanical, e.g., that includes an electrostatic mechanism.

In example coated filter membranes as described, the porous polymeric filter layer can act to remove materials from a flow of liquid passing through the coated filter membrane by way of a sieving mechanism, and the polymer film coating that includes polyamide polymer can act to remove materials from the flow of liquid by way of a non-sieving mechanism.

A porous polymeric filter layer of a coated filter membrane can be any of a general range and variety of porous polymeric filter materials used and useful for applications in filtering high purity liquids. A porous polymeric filter layer may be characterized by its chemical makeup, a general shape, and by one or more of pore size, porosity, bubble point, and thickness, among other physical and performance features.

A shape may be a planar sheet extending in a length and a width dimension to define two opposed major surfaces, which are separated by a thickness in a third dimension. The sheet may preferably have a relatively uniform thickness over the length and width dimensions. An alternate shape can be a hollow fiber, which can include a length and a substantially uniform thickness extending between an inner diameter and an outer diameter.

A variety of different polymers are available to form a porous polymeric filter layer (e.g., membrane) with certain examples including non-fluorinated polymers such as polyolefins, polyhaloolefins, polyesters, polyimides, polyetherimides, polysulfones, polyethersulfones, polycarbonates, as well as fluoropolymers, and other general and specific types of useful polymers.

Suitable polyolefins include, for example, polyethylene (e.g., ultra high molecular weight polyethylene (UPE)), polypropylene, alpha-polyolefins, poly-3-methyl-1-butene, poly-4-methyl-1-butene, and copolymers of ethylene, propylene, 3-methyl-1-butene, or 4-methyl-1-butene with each other or with minor amounts of other olefins; example polyhaloolefins include polytetrafluoroethylene, polyvinylidene fluoride, and co-polymer of these and other fluorinated or non-fluorinated monomers. Example polyesters include polyethylene terephthalate and polybutylene terephthalate, as well as related co-polymers.

In some embodiments, porous polymeric filter layers need not be fluorinated or perfluorinated, and may contain entirely non-fluorinated polymer made essentially from non-fluorinated monomers. Example filter layers may comprise, consist of, or consist essentially of polyolefin, such as polyethylene (e.g. UPE). Presently preferred polymeric filter layers contain, consist, or consist essentially of non-fluorinated polymer materials. A porous polymeric filter layer that consists essentially of non-fluorinated materials can contain less than 0.5, 0.1, or 0.01 weight percent fluorine. A porous polymeric filter layer that consists essentially of polyolefin, e.g., polyethylene, can be derived from monomers that include at least 99, 99.5, or 99.0 weight percent polyolefin (e.g., polyethylene) monomers.

A porous polymeric filter of any composition may optionally be treated, e.g., plasma treated, to enhance adhesion or filtering properties.

In some embodiments, filter layers are made of a non-nylon polymer, such as polyolefin, e.g., polyethylene, e.g., ultrahigh molecular weight polyethylene (UPE). Nylons are often prepared by use of a metal catalyst such as magnesium. The magnesium present in a filter layer may be potentially extracted during use in filtering certain types of liquids, such as acidic liquids. In some embodiments, a filter layer may be made of a non-nylon polymer, to avoid the presence of such extractable metals. According to useful examples of the present invention, a coated filter membrane can include (comprise, consist of, or consist essentially of) a non-nylon porous polymeric filter layer (e.g., a polyolefin, e.g., UPE, filter membrane) coated with a crosslinked polyamide as described. The metal (e.g., magnesium) content of a polyamide-coated non-nylon (e.g., UPE) porous polymeric filter layer will be substantially lower than the metal (e.g., magnesium) content of a comparable nylon filter layer. A porous polymeric filter layer (e.g., a polyolefin, e.g., UPE, filter membrane) may consist of or consist essentially of non-nylon polymer; a porous polymeric filter layer that consists essentially of non-nylon polymer is a filter membrane that contains not more than 5, 2, 1, or 0.5 weight percent nylon based on total weight of the filter membrane, e.g., contains at least 95, 98, 99, or 99.5 weight percent non-nylon polymer such as a polyolefin (e.g., polyethylene, polypropylene, UPE, or the like) based on total weight porous polymeric filter layer.

Example porous polymeric filter layers may have pores of a size (average pore size) to be considered either a microporous filter membrane or an ultrafilter membrane. A microporous membrane can have an average pore size in a range on from about 0.05 microns to about 10 microns, with the pore size be selected based on one or more factors that include: the particle size or type of impurity to be removed, pressure and pressure drop requirements, and viscosity requirements of a liquid being processed by the filter. An ultrafilter membrane can have an average pore size in a range from 0.001 microns to about 0.05 microns. Pore size is often reported as average pore size of a porous material, which can be measured by known techniques such as by Mercury Porosimetry (MP), Scanning Electron Microscopy (SEM), Liquid Displacement (LLDP), or Atomic Force Microscopy (AFM).

Bubble point is also a known feature of a porous membrane. By a bubble point test method, a sample of porous polymeric filter layer is immersed in and wetted with a liquid having a known surface tension, and a gas pressure is applied to one side of the sample. The gas pressure is gradually increased. The minimum pressure at which the gas flows through the sample is called a bubble point. Examples of useful bubble points of a porous polymeric filter layer that is useful or preferred according to the present description, measured using HFE 7200, at a temperature of 20-25 degrees Celsius, can be in a range from 2 to 400 psi, e.g., in a range from 20 to 200 psi.

A porous polymer filter layer as described may have any porosity that will allow the porous polymer filter layer to be effective as described herein, for filtering a flow of liquid to produce a high purity filtered liquid material. Example porous polymer filter layers can have a relatively high porosity, for example a porosity of at least 50, 60, 70, 80, 85, 90, 95, or 98 percent, e.g., a porosity in a range from 50, 60, 70, 80, or 85 to 90, 95, or 98 percent. As used herein, and in the art of porous bodies, a "porosity" of a porous body (also sometimes referred to as void fraction) is a measure of the void (i.e. "empty") space in the body as a percent of the total volume of the body, and is calculated as a fraction of the volume of voids of the body over the total volume of the body. A body that has zero percent porosity is completely solid.

A porous polymeric filter layer as described can be in the form of a sheet or hollow fiber having any useful thickness, e.g., a thickness in a range from 5 to 100 microns, e.g., from 20 to 50 microns.

According to the present description, physical features of a coated filter membrane will be substantially determined by and comparable to or approximately equal to corresponding physical features of the porous polymeric filter layer. The porous polymeric filter layer may be selected based on physical features that include bubble point, porosity, pore size, and thickness. Upon being coated with the non-porous film coating that includes crosslinked polyamide polymer, as described, these physical features may remain substantially or approximately the same for the coated filter membrane.

The coated filter membrane includes a polyamide film coating as described, e.g., a continuous or semi-continuous film coating on surfaces of the porous polymeric filter layer. The polyamide film coating includes crosslinked polyamide that is effective as a filtering component of the coated filter membrane and that improves filtering performance (e.g., filtering effectiveness or retention) of the coated filter membrane by acting as a non-sieving filtering medium. The polyamide can be selected for its filtering effectiveness and also for its processability. For processability, a preferred polyamide is one that before being crosslinked can be effectively (and preferably efficiently) placed by a useful coating method on surfaces of the porous polymeric filter layer and then crosslinked to improve the solvent resistance of the polyamide.

To provide desired processability, preferred polyamides can be capable of being dissolved in solvent to form a polymer solution that can be coated onto a surface of a porous polymeric filter layer in a desired amount and then precipitated from the polymer solution onto surfaces of the porous polymeric filter layer; i.e., preferred polyamides can be dissolved in solvent and precipitation coated onto surfaces of the porous polymeric filter layer. The amount and placement of the polyamide material coated onto the surfaces should be sufficient to allow for the polyamide to improve the filtering performance of the porous polymeric filter membrane, but should not cause any unacceptable detrimental effect with respect to flow or filtering properties of the porous polymeric filter membrane, such as to significantly reduce the ability of liquid to flow through the porous polymeric filter membrane during use as a filter.

The crosslinked polyamide can be one that is effective to act as a filter medium as described herein, and is preferably one that in a pre-crosslinked form can be provided as a coating on the porous polymeric film coating by a useful coating technique, such as by precipitation coating, preferably from a polymer solution in which the polyamide (before being crosslinked) is dissolved in solvent as described herein.

Polyamides are a class of well-known polymers that include nylons. Polyamides are chemically considered to be polymers that include multiple repeating carbon-based organic polymeric backbone units separated by repeating amide linkages. The term "polyamide" refers to polymers that include those derived from two or more reactive monomer compounds (e.g., polyamide "copolymers" and "terpolymers") having recurring amide groups, as well as blends of two or more different such polyamides.

Polyamides can be prepared by reacting monomers or reactive ingredients that include functional groups capable of combining to form a polymer backbone having repeating amide linkages. Accordingly, examples of monomers and reactive materials that are useful to prepare polyamides include di-amine monomers and di-carboxylic acid monomers. Example polyamides include copolymers and terpolymers prepared by polymerizing a combination of two or three diamine and dicarboxylic acid monomers.

A useful monomer such as a diamine or a dicarboxylic acid may be linear, including a saturated linear hydrocarbon compound and two functional groups, e.g., two amine or two carboxylic acid groups. These compounds react to form linear (e.g., aliphatic) units of a polyamide backbone. Other useful monomers may be compounds that include two functional groups (e.g., amine or carboxylic acid groups) attached to a non-linear compound such as an aromatic compound or a saturated cyclic or di-cyclic compound. These compounds react to form non-linear units, e.g., cyclic or polycyclic units, of a polyamide backbone.

In some embodiments, polyamides of the present description, useful in a film coating on a coated filter membrane, can include linear and non-linear backbone units, e.g., may be derived by reacting linear monomers and non-linear monomers to produce a polyamide having backbone units that include linear backbone units and non-linear backbone units. The non-linear backbone units may preferably be effective to increase the ability of the polyamide, in a non-crosslinked state, to dissolve in a desired solvent to form a polymer solution as described.

Certain specific non-limiting examples of linear compounds (monomers) that may be useful to prepare a polyamide as described herein include caprolactam, hexamethylenediamine adipate, and combinations of these. A specific non-limiting example of a non-linear compound (monomer) that may be useful to prepare a polyamide as described is 4,4-diamino-dicyclohexylmethane adipate. These example monomers are not to be construed to limit the types of monomers or reactive materials that can be used to prepare a useful polyamide of the present description. Other linear monomers (e.g., linear di-amines and linear di-carboxylic acid groups) are also useful to prepare a polyamide as described, as are other non-linear monomers (e.g., di-amine and di-carboxylic acid compounds that include a cyclic six-membered saturated ring structure (e.g., a bivalent cycloalkylene residue) or two connected cyclic six-membered saturated ring structures (e.g., a bivalent di-cycloalkylene residue)).

The polyamide as described can preferably be made of repeating amide groups that are separated by a combination of linear and non-linear backbone units that cause or allow the polyamide to be solvent processable in a desired solvent, as described, that is different from formic acid and from calcium chloride. A polyamide is considered to be solvent processable if the polyamide, prior to crosslinking, can be dissolved into a solvent to form a polymer solution that can be applied as a coating to a porous polymeric filter layer. The polyamide is preferably completely soluble in the solvent in an amount that is sufficient to allow for the polyamide to form a polymer solution useful for coating, e.g., useful for coating by immersion precipitation.

The polyamide is not required to be melt processable, as are certain polyamides and nylons, e.g., to be thermoplastic, meaning that the polyamide may be passed between a liquefied (melted) and a solid state, e.g., repeatedly, without the polyamide becoming substantially degraded.

Various polyamides are known to be solvent processable using certain types of solvents such as some acidic solvents (e.g., formic acid) and certain ionic solvents (e.g., calcium chloride). For example, some nylons, e.g., nylon 66, are soluble in formic acid as well as calcium chloride, but are not generally soluble in other organic materials. Formic acid, however, can be difficult to work with. And calcium chloride is not a preferred solvent for use in preparing a nylon material for a filter used to filter high purity liquids such as those used in semiconductor processing, because calcium chloride can result in unacceptable levels of impurities being present on a nylon material coated from calcium chloride.

Preferred non-crosslinked polyamide materials of the present description can be solvent processable in solvent that is different from formic acid and that is different from calcium chloride. More generally, certain useful and preferred non-crosslinked polyamides can be soluble in various non-acidic solvents, e.g., organic solvents (optionally with a water component) that are different from formic acid and calcium chloride, that are easier to handle relative to formic acid, and that do not result in undesired residue being present with a coated polyamide for use in a filter for processing high purity materials.

A useful or preferred non-crosslinked polyamide of the present description may be soluble in at least one alternative solvent, i.e., a solvent that is different from formic acid and different from calcium chloride, and can preferably be made entirely of (e.g., consist of or consist essentially of) solvents that do not include formic acid or calcium chloride. A solvent that consists essentially of solvents that differ from formic acid and calcium chloride refers to solvent that contains one or a combination of solvents different from formic acid and calcium chloride, and optional water, with not more than 5, 2, 1, or 0.5 weight percent of formic acid or calcium chloride.

Examples of alternative solvents include a variety of organic, non-acidic, non-ionic solvents that are commonly used, handled, and processed in various industrial and commercial processes, and that can be used to dissolve the non-crosslinked polyamide and form a coating of the polyamide that does not include an unacceptable amount of solvent-derived residue. The solvent is one that will dissolve the non-crosslinked polyamide in an amount that is useful and sufficient to allow the solvent to be a vehicle for coating a desired amount of the non-crosslinked polyamide onto a substrate, e.g., onto a porous polymeric filter layer by an immersion precipitation coating method.

Presently preferred examples of solvents that are different from formic acid and that are different from calcium chloride include lower aliphatic alcohols (e.g., a C1 through C3, C4, C5, or C6 aliphatic alcohol) such as methanol, ethanol, propanol, butanol, isopropanol, as well as chlorinated hydrocarbons. A useful or preferred non-crosslinked polyamides of the present description will be soluble in one or a combination of these solvents, optionally in combination with water, to a degree that will allow the non-crosslinked polyamide to be coated from the solvent onto a porous polymeric filter layer as described herein. Certain presently-preferred non-crosslinked polyamides are capable of being dissolved in solvent that consists of or consists essentially of propanol and optional water, e.g., that is made of only propanol optionally in combination with not more than 20 weight percent water based on total weight solvent.

Accordingly, useful or preferred solvent may comprise, consist of, or consist essentially of solvent that includes one or a combination of the following, optionally also in combination with an amount of water: a lower aliphatic alcohol such as methanol, ethanol, propanol, butanol, isopropanol; and one or more chlorinated hydrocarbon. The solvent can optionally include an amount of water, e.g., up to about 20, 10, or 5 percent water.

A solvent that consist essentially of a specified solvent or combination of solvents (with an optional amount of water) is a solvent that contains the specified solvent or combination of solvents and not more than 5, 2, 1, or 0.5 weight percent of materials (e.g., solvent) that is different from the specified solvent or solvents. A solvent that consists essentially of one or a combination of a lower aliphatic alcohol such as methanol, ethanol, propanol, butanol, isopropanol, chlorinated hydrocarbon, or combination thereof, with optional water, is a solvent that contains one or a combination of these solvents and optional water with not more than 5, 2, 1, or 0.5 weight percent of any other material.

Depending on the solvent, heat may be used to allow for or to accelerate dissolution of the non-crosslinked polyamide in the solvent. For example, in the absence of heat, a non-crosslinked polyamide may take many hours or multiple days to fully dissolve in a solvent as described. By heating the solvent, e.g., to a temperature in a range from 60 to 80 degrees Celsius, the amount of time will be reduced. Preferably, with heat, a non-crosslinked polyamide as described may become fully dissolves in solvent in a matter of hours (e.g., 2, 4, or 6 hours) or less (e.g., less than 40, 30, 20, or 10 minutes).

According to some embodiments of polyamides and methods of the present description, a polyamide can be dissolved in solvent to form a polymer solution that can be applied to a porous polymeric filter layer by an immersion precipitation method, followed by a step of crosslinking the polyamide. A general method includes one or more steps that include: forming or otherwise providing a polymer solution that includes the non-crosslinked polyamide dissolved in solvent (e.g., non-formic acid-containing and non-calcium chloride-containing solvent as described herein with an optional amount of water) along with a free-radical source material; applying the polymer solution to the porous polymeric filter layer; causing the polyamide of the polymer solution to precipitate (e.g., caused to coagulate) out of solution and onto the porous polymeric filter layer; crosslinking the polyamide that has been coated onto porous polymeric filter layer; and drying the polyamide.

A step of precipitating polymer from the polymer solution onto the filter layer, also known as immersion precipitation or phase inversion, is a generally known method of placing a polymer film onto a substrate. By this technique, as applied to a polyamide and polymer solution of the present description, a polymer solution that contains the polyamide can be coated onto a porous polymeric filter layer, and polyamide of the polymer solution can be precipitated from the polymer solution onto the porous polymeric filter layer by contacting the filter layer coated with the polymer solution with a coagulation liquid (e.g., by immersing the coated filter layer in a coagulation bath) that contains nonsolvent such as an aqueous liquid. Due to the solvent and nonsolvent exchange that occurs when the polymer solution is exposed to the coagulation liquid, polymer (i.e., non-crosslinked polyamide) from the polymer solution precipitates onto the surfaces of the film layer on which the polymer solution has been coated. The polymer must be soluble in the solvent of the polymer solution and must precipitate or coagulate upon contact with the non-solvent (e.g., aqueous liquid) of the coagulation liquid.

The polymer solution contains any effective amount of each of the solvent, dissolved polyamide, and free radical source material. Example polymer solutions may contain up to about 10 or 20, e.g., from 0.5 to 8 or from 0.5 to 5 or 3 weight percent polyamide, up to about 5, e.g., from 0.5 to 6 or from 1 to 5 weight percent free radical source material, based on total weight of the polymer solution, with the balance being solvent (e.g., organic solvent as described herein optionally in combination with an amount of water).

Example polymer solutions do not require and may exclude acidic solvent such as formic acid and ionic solvent such as calcium chloride. A preferred solvent may be propanol with optional water, but other solvents may be used alone or in combination with propanol, including example solvents described herein that are non-acidic, non-basic, and non-ionic.

The polymer solution may comprise, consist of, or consist essentially of the polyamide, free-radical source material, and solvent (e.g., as described and exemplified herein). A polymer solution that consists essentially of polyamide, free-radical source material, and solvent (e.g., as described and exemplified herein) refers to a polymer solution that contains at least 95, 98, 99, or 99.5 weight percent of the polyamide, free-radical source material, and solvent (as described and exemplified herein) and not more than 0.5, 1, 2, or 5 weight percent of any other material.

After the polyamide has been precipitated onto the surfaces of the filter layer, the polyamide can be crosslinked to increase the solvent resistance of the polyamide. A polyamide that is crosslinked refers to a polyamide in which the polymeric chains of a polyamide composition (e.g., coated and precipitated polyamide) are chemically cross-connected to each other; thus, at least one polyamide chain is cross-connected (chemically bound) to at least one other polyamide chain in at least one position, optionally wherein multiple bonds are present between the one single polyamide chain and one, two, or more other polyamide chains.

Crosslinking can be made to occur by any useful mechanism, with a preferred method being exposing the coated polyamide material to a free-radical source material and a source of radiation, such as ultraviolet (UV) radiation. Useful examples of free-radical source materials are well known and include photoinitiators such as benzoin, substituted benzoins such as benzoin ethyl ether, benzophenone, benzophenone derivatives, Michler's ketone, alplhahydroxyketone, benzildimethylketal, isopropylthioxanthane, dialkoxyacetophelnones such as diethoxyacetophenone, acetophenone, benzil, peroxides, and other derivatives (substituted forms) and mixtures thereof. An example of a preferred free-radical source material is benzophenone. This or another free-radical source material can be used in combination Optionally, if desired, a polymer solution can include one or more additional multi-functional, e.g., polyfunctional compounds that increase the level of crosslinking between the polyamide chains of a polymer solution. A crosslinking agent is not necessary, and example polymer solutions do not require and may exclude the presence of multi-functional crosslinking agents in addition to the polyamide polymer.

The method used to cause crosslinking of the polyamide may be any method that is useful to provide a crosslinked polyamide that has increased resistance to solvent relative to the non-crosslinked polyamide. Methods other than the use of UV radiation and a free-radical source may be useful, for example by use of e-beam radiation.

A crosslinked polymer as described, coated onto a porous polymeric filter as part of a coated filter membrane, can be characterized in terms of dye-binding capacity of the crosslinked polymer. In specific, a charged dye can be caused to bind to a surface of a crosslinked polymer. The amount of the dye that can be bound to the crosslinked polymer can be measured quantitatively by spectroscopic methods based on a difference in measured absorption readings of the membrane at an absorption frequency of the dye, taken before and after application of the crosslinked polyamide. The dye-binding capacity can be assessed by use of a negatively-charged dye, and also by use of a positively-charged dye.

In some embodiments, a filter membrane that is coated with crosslinked polyamide can have a dye-binding capacity for a positively-charged dye, for a negatively-charged dye, or both, that is greater than a comparable filter that is made from or coated with certain previously-used polyamides, such as nylon 6 or nylon 66, when assessed using the same performance or testing conditions. A coated filter membrane as described may have a dye-binding capacity for methylene blue dye that is at least 0.2 micrograms per milligram of the filter membrane (µg/mg), e.g., greater than 0.5, or 1.0 µg/mg; alternately or in addition, a coated filter membrane as described may have a dye-binding capacity for Ponceau-S dye that is at least 0.2, micrograms per milligram filter membrane (µg/mg), e.g., greater than 0.05, 0.25, 0.5, or 0.6 µg/mg.

In some embodiments, the filter membranes coated with crosslinked polyamide disclosed herein have less than 1.0 ng/cm$^2$ (nanograms per square centimeters), 0.9 ng/cm$^2$, 0.8 ng/cm$^2$, 0.7 ng/cm$^2$, 0.6 ng/cm$^2$, 0.5 ng/cm$^2$, or 0.4 ng/cm$^2$ of magnesium (Mg) extracted from a sample of the membrane having a diameter of 47 mm and a thickness of 55 microns when the sample is soaked in 15 ml of a 0.1 N solution HCl (hydrochloric acid) for 24 hours. The amount of Mg is measured by inductively coupled plasma mass spectrometry (ICP-MS). A crosslinked polyamide film coating on the porous polymeric filter may optionally be treated, e.g., plasma treated, to enhance filtering properties.

As part of the desired coating properties of the polyamide, the crosslinked and dried polyamide film coating should not cause an unacceptably high degree of blocking of the pores of the porous film layer, e.g., should not cause an unacceptable change in the flow properties of the porous polymeric filter layer of the coated filter membrane. The amount and rate of flow of liquid through the coated film membrane (i.e., the porous polymer film coating following placement of the polyamide film coating on the porous polymer film layer) should be sufficient and acceptable to allow the coated film membrane to be functional as a commercial filter membrane. By suitable examples of methods that can provide a coating as described, a polyamide may preferably be coated onto a porous polymeric filter layer by applying a polymer solution that contains the (non-crosslinked) polyamide dissolved in solvent onto surfaces of the porous polymeric filter layer and causing precipitation (coagulation) of the (non-crosslinked) polyamide out of the polymer solution and onto the surfaces of the filter layer. The precipitated (non-crosslinked) polyamide covers surfaces of the porous polymeric filter layer in an amount for the coated polyamide, after crosslinking and drying, to function effectively as a non-sieving filtering medium, without significantly clogging the openings of the porous filter membrane, i.e., without reducing flow through the membrane by more than 30, 20, 10, or 5 percent (based on flowrate, or measured as a 5, 10, 20, or 30 percent increase in flowtime).

A filter membrane as described herein, or a filter or filter component that contains the filter membrane, can be useful in a method of filtering a liquid chemical material to purify or remove unwanted materials from the liquid chemical material, especially to produce a highly pure liquid chemical material that is useful for an industrial process that requires chemical material input that has a very high level of purity. Generally, the liquid chemical may be of any of various useful commercial materials, and may be a liquid chemical that is useful or used in any application, for any industrial or commercial use. Particular examples of filters as described can be used to purifying a liquid chemical that is used or useful in a semiconductor or microelectronic fabrication application, e.g., for filtering a liquid solvent or other process liquid used in a method of semiconductor photolithography. Some specific, non-limiting, examples of solvents that can be filtered using a filter membrane as described include: n-butyl acetate (nBA), isopropyl alcohol (IPA), 2-ethoxyethyl acetate (2EEA), a xylene, cyclohexanone, ethyl lactate, methyl isobutyl carbinol (MIBC), methyl Isobutyl Ketone (MIBK), isoamyl acetate, undecane, propylene glycol methyl ether (PGME), and propylene glycol monomethyl ether acetate (PGMEA).

To be useful for filtering a liquid chemical, e.g., a solvent, a crosslinked polyamide as described must be resistant to the liquid chemical that is being filtered, e.g., substantially resistant to degradation in the presence of these liquids. Preferred crosslinked polyamide materials are resistant to a liquid chemical (e.g., solvent or acid) being filtered, and is also effective to process the liquid chemical by filtration to produce a liquid chemical that has a very low level of impurities such as dissolved metals, and very low level of suspended particles or other impurities or contaminants.

The coated filter membrane can be contained within a larger filter structure such as a filter or a filter cartridge that is used in a filtering system. The filtering system will place the coated filter membrane, e.g., as part of a filter or filter cartridge, in a flow path of a liquid chemical to cause the liquid chemical to flow through the coated filter membrane so that the coated filter membrane is able to remove of impurities and contaminants from the liquid chemical. The structure of a filter or filter cartridge may include one or more of various additional materials and structures that support the coated filter membrane within the filter to cause fluid to flow from a filter inlet, through the coated membrane, and thorough a filter outlet, thereby passing through the coated filter membrane when passing through the filter. The coated filter membrane supported by the filter structure can be in any useful shape, e.g., a pleated cylinder, cylindrical pads, one or more non-pleated (flat) cylindrical sheets, a pleated sheet, among others.

One example of a filter structure that includes a coated filter membrane in the form of a pleated cylinder can be prepared to include the following component parts, any of which may be included in a filter construction but may not be required: a rigid or semi-rigid core that supports a pleated cylindrical coated filter membrane at an interior opening of the pleated cylindrical coated filter membrane; a rigid or semi-rigid cage that supports or surrounds an exterior of the pleated cylindrical coated filter membrane at an exterior of the filter membrane; optional end pieces or "pucks" that are situated at each of the two opposed ends of the pleated cylindrical coated filter membrane; and a filter housing that includes an inlet and an outlet. The filter housing can be of any useful and desired size, shape, and materials, and can preferably be made of suitable polymeric materials.

EXAMPLES

Porosimetry Bubble Point

A porosimetry bubble point test method measures the pressure required to push air through the wet pores of a membrane. A bubble point test is a well-known method for determining the pore size of a membrane.

Flow Rate Measurement

Isopropanol (IPA) flow rate was determined by cutting membranes into 47 mm disks and wetting with IPA before placing the disk in a filter holder with a reservoir for holding a volume of IPA. The reservoir is connected to a pressure regulator. IPA was flowed through the membrane under 14.2 psi (pounds per square inch) differential pressure. After equilibrium was achieved, the time for 10 ml of IPA to flow through the membrane was recorded.

Example #1

This example describes the preparation of 14 wt % polyamide stock solution. To a round bottom flask equipped with a stir bar and a condenser, 14 grams of Ultramid1C (BASF) resin were added to 86 g of 1-propanol (Sigma)/DI water mixture. The latter was prepared by mixing 20 ml DI water with 80 ml of 1-Propanol. The mixture was heated under reflux for 10 hours until all resin dissolved. The resulting solution was clear and free of undissolved solids.

Example #2

This example describes the preparation of polyamide coating solution

A solution was made containing 2 g of Benzophenone (Sigma), 28.57 g of the stock solution prepared in Example 1 and 69.43 g of Propanol:Water mixture solution (80:20 Vol %). Complete dissolution of the Benzophenone occurred after continued mixing for 30 minutes.

Example #3

This example demonstrates the coating of UPE membrane with polyamide

A 47 mm disk of UPE (99 psi, HFE mean bubble point) was wet for 10 seconds with the coating solution described in Example 2. The membrane disk was removed and placed between 1 mil polyethylene sheets. The excess solution was removed by rolling a rubber roller over the polyethylene/membrane disk/polyethylene sandwich as it lays flat on a table. The UPE membrane was removed from the sandwich and immediately placed in deionized (DI) water, where it was washed by swirling for 2 minutes to precipitate the coating solution on the surfaces of the porous membrane disk. The membrane disk was removed and placed again between 1 mil polyethylene sheets. The excess water was removed by rolling a rubber roller over the polyethylene/membrane disk/polyethylene sandwich as it lays flat on a table. The polyethylene sandwich was then taped to a transport unit which conveyed the assembly through a Fusion Systems broadband UV exposure lab unit emitting at wavelengths from 200 nm to 600 nm. Time of exposure is controlled by how fast the assembly moves through the UV unit. In this example, the assembly moved through the UV chamber at 8 feet per minute. After emerging from the UV unit, the membrane was removed from the sandwich and immediately placed in a 60 wt % Isopropanol solution containing 2.5 wt % HCl, where it was washed by swirling for 12 hours. The coated membrane disk was further washed in 100% Isopropanol solution by swirling for 1 hr. Following this washing procedure the membrane was dried on a holder in an oven operating at 50° C. for 10 min.

The average Isopropanol flow rate of six coated membrane disk samples was 5.1 ml/min. The average flow rate of three samples of uncoated membrane tested was 6.2 ml/min. The average HFE mean bubble point of six coated membrane disk samples was 96 psi.

Example #4

This example demonstrates the methylene blue dye binding capacity of UPE disks prepared in the manner described in Example 3. This example further demonstrates that the process of Example 3, when performed with the coating solution of Example 2, yields a UPE membrane than can bind positively charged.

Three water wet 47 mm coated disk membranes of Example 3, were placed in a beaker containing 50 ml of 0.00075 wt % methylene blue dye (Sigma) adjusted to pH 10 with 10 M Sodium hydroxide. The beaker was covered and the coated membrane disks were soaked for 2 hrs with continuous mixing at room temperature. The disks were then removed and the absorbance of the dye solution was measured using a Cary spectrophotometer (Agilent Technologies) operating at 664 nm. The membranes were rinsed in water and soaked in 50 ml of 100% Isopropanol for 30 min. This step desorbs any non-specifically bound dye molecules to the membrane surface. Nonspecific adsorption refers to dye molecules not bound to the coated membrane surface through electrostatic interactions. The membrane disks were then removed and the absorbance of the isopropanol solution was measured using a Cary spectrophotometer (Agilent Technologies) operating at 656 nm.

Figure 2:
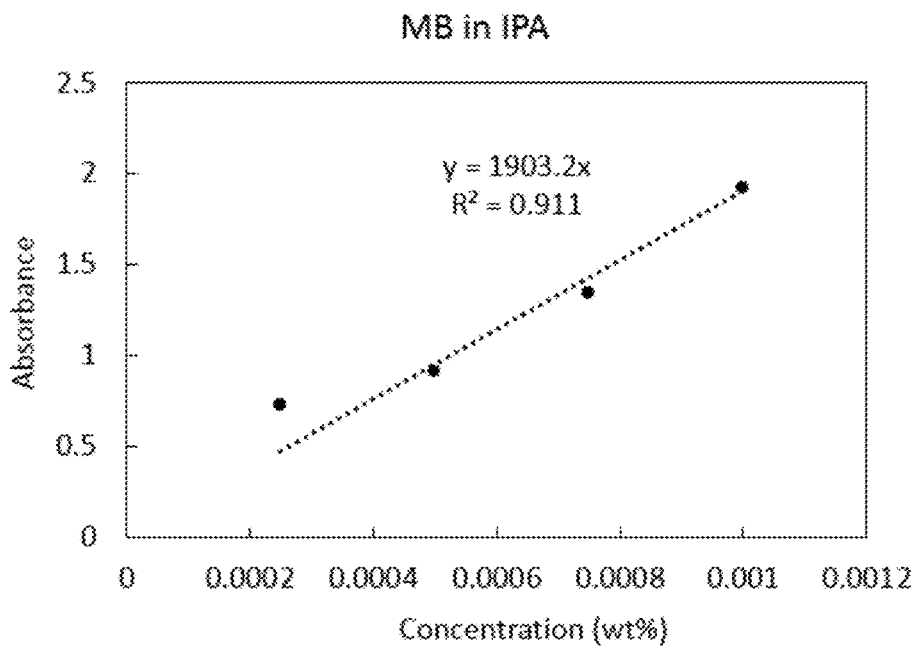

The slope of the calibration curves depicted in FIGS. 1 and 2 were used to convert dye solution absorbance data before and after soaking the membrane and Isopropanol solution absorbance data to mass of Methylene blue dye bound to the membrane per membrane unit mass. The dye is cationic in nature, and it bound to the negatively charged groups imparted to the membrane by the polyamide coating with an average dye binding capacity of 1.4 µg/mg. In contrast, uncoated UPE membrane had an average dye binding capacity of 0.1 µg/mg under similar experimental conditions.

Example #5

This example demonstrates the Ponceau-S dye binding capacity of UPE disks prepared in the manner described in Example 3. This example further demonstrates that the process of Example 3, when performed with the coating solution of Example 2, yields a UPE membrane than can bind negatively charged dye.

Three water wet 47 mm coated disk membranes of Example 3, were placed in a beaker containing 50 ml of 0.002 wt % Ponceau-S dye (Sigma) solution. The beaker was covered and the coated membrane disks were soaked for 2 hrs with continuous mixing at room temperature. The disks were then removed and the absorbance of the dye solution was measured using a Cary spectrophotometer (Agilent Technologies) operating at 518 nm. The membranes were rinsed in water and soaked in 50 ml of 100% Isopropanol for 30 min. This step desorbs any non-specifically bound dye molecules to the membrane surface. The membrane disks were then removed and the absorbance of the Isopropanol solution was measured using a Cary spectrophotometer (Agilent Technologies) operating at 501 nm.

Figure 3:
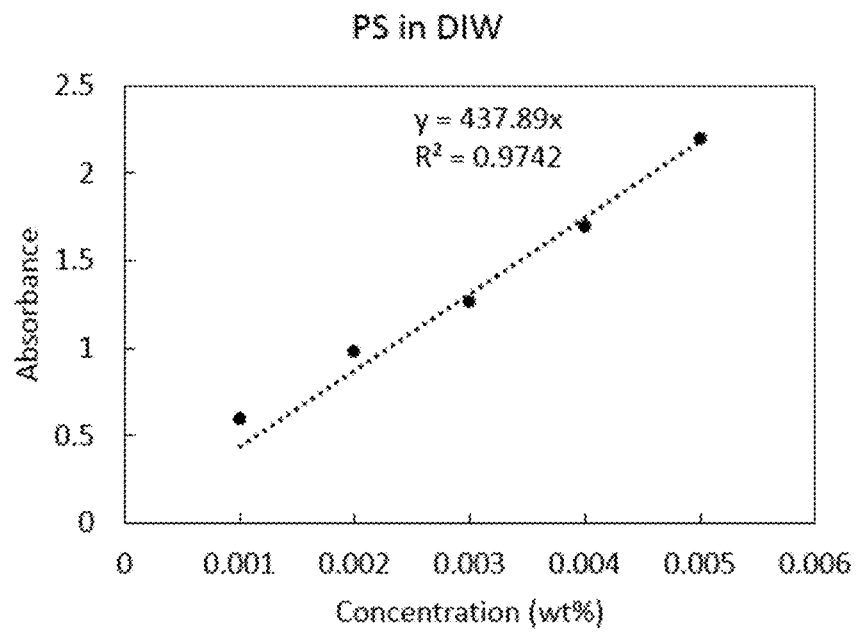
Figure 4:
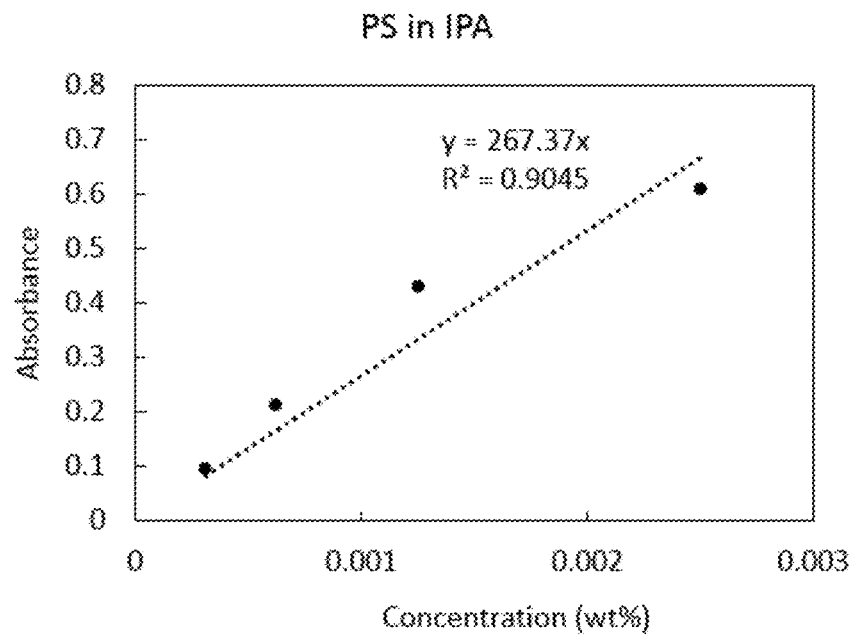

The slope of the calibration curves depicted in FIGS. 3 and 4 were used to convert dye solution absorbance data before and after soaking the membrane and Isopropanol solution absorbance data to mass of dye bound to the membrane per membrane unit mass. The dye is anionic in nature, and it bound to the positively charged groups imparted to the membrane by the polyamide coating with an average dye binding capacity of 0.75 µg/mg. In contrast, uncoated UPE membrane had an average dye binding capacity of 0.05 µg/mg under similar experimental conditions.

Example #6

This example demonstrates the Methylene blue and Ponceau-S dye binding capacity of Nylon 6,6 membrane One water wet 47 mm coupon of Nylon 6,6 membrane with greater than 100 psi HFE mean bubble point was soaked in 50 ml Methylene blue or Ponceau-s dye solutions as described in Examples 4 and 5. The membrane bound Methylene blue with an average dye binding capacity of 5.4 µg/mg and Ponceau-s with an average dye binding capacity of 4.3 µg/mg.

Example #7

This example demonstrates the Methylene blue and Ponceau-S dye binding capacity of Nylon 6 membrane One water wet 47 mm coupon of Nylon 6 membrane with 62 psi HFE mean bubble point was soaked in 50 ml Methylene blue or Ponceau-s dye solutions as described in Examples 4 and 5. The membrane bound Methylene blue with an average dye binding capacity of 1.4 µg/mg and Ponceau-s with an average dye binding capacity of 10.7 µg/mg.

Example #8

This example demonstrates that a Polyamide coated UPE membrane is cleaner than Nylon 6 membrane in terms of metal extractable in low pH solution.

Figure 5:
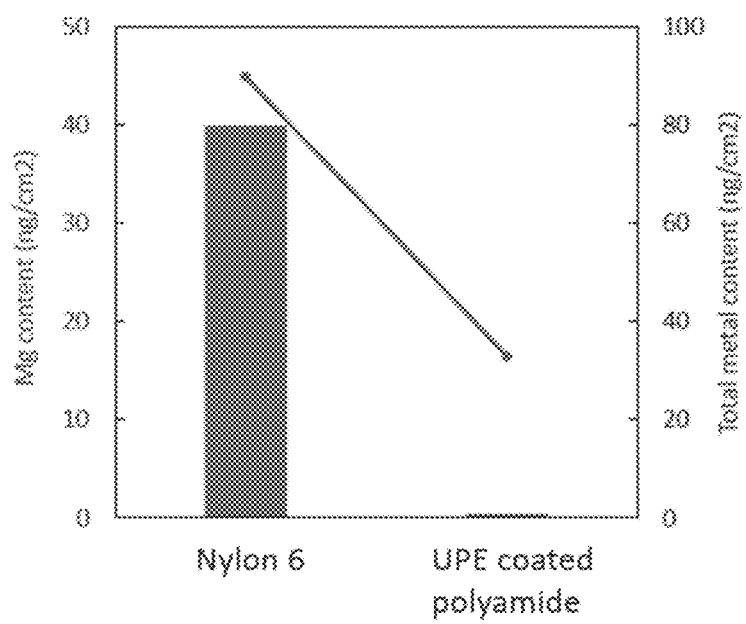
FIG. 5 shows data relating to amounts of metal extracted from filter membranes.

47 mm disk of Nylon 6 membrane and 47 mm disk of the membrane prepared in Example 3 were extracted in 0.1N HCl. ICP-MS was used to quantify the amount of metal extracted. As depicted in FIG. 5, 40 ng/cm2 of Mg extracted from Nylon 6 membrane compared to 0.4 ng/cm2 Mg extracted from Polyamide coated UPE membrane. Total metal extracted was 90 ng/cm2 and 33 ng/cm2 from Nylon 6 and Polyamide coated UPE membranes, respectively.

Example #9

This example demonstrates that a Polyamide coated UPE membrane is stable in low pH organic solvent.

Samples of UPE coated Polyamide membrane were soaked in 60 wt % Isopropanol solution containing 3.5 wt % HCl for a period of 9 days. The amount of Polyamide on the membrane surfaces at time 0 and after soaking in the low pH organic solvent was determined by ATR-FTIR ("ATR") spectroscopy in the form of a peak ratio. ATR measurements were performed with a Bruker Tensor 27 FTIR fitted with ATR assembly housing a germanium crystal. All spectra were recorded with 32 scans, at 4 cm-1 resolution. Background was bare crystal. The peak areas at 1713 and/or 1496 cm-1 (corresponding to amide stretches) were obtained using OPUS data collection program and the sum was divided by the total peak area at 2918 and 2850 cm-1 (corresponding to UHMWPE stretches) to obtain the grafted amount of acryl amide monomer on UHMWPE (ultra high molecular weight polyethylene) surface. Using the UHMWPE signal as a convenient internal standard normalizes out differences in absolute absorbance intensities of amide peaks that could result from variation in the level of modification from one membrane disk to the other.

Figure 6:
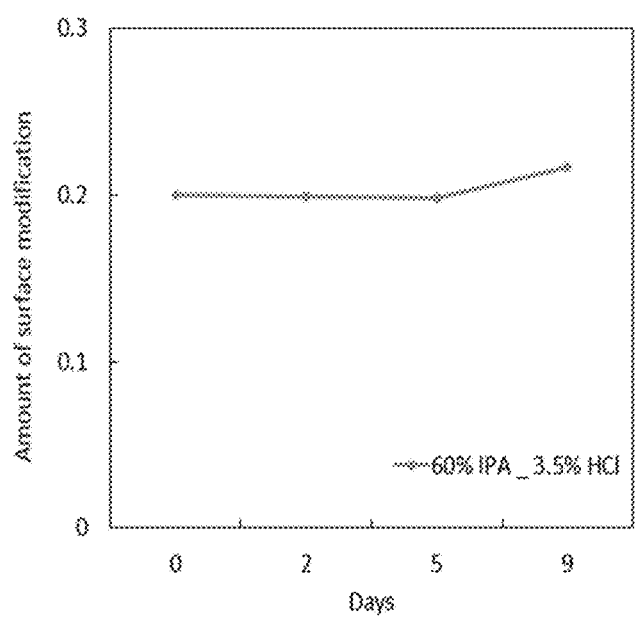
FIG. 6 shows data relating to stability of a polyamide coating upon exposure to a low pH organic solvent.

As depicted in FIG. 6, the amount of Polyamide coated on the membrane surface did not decrease after exposure to low pH organic solvent. This indicates that the polyamide coating will be stable in photo applications like BARC, ITC and SOG that are acidic in nature.

Example #10

This example demonstrates that a Polyamide coated UPE membrane is stable in common photoresist solvents.

Figure 7:
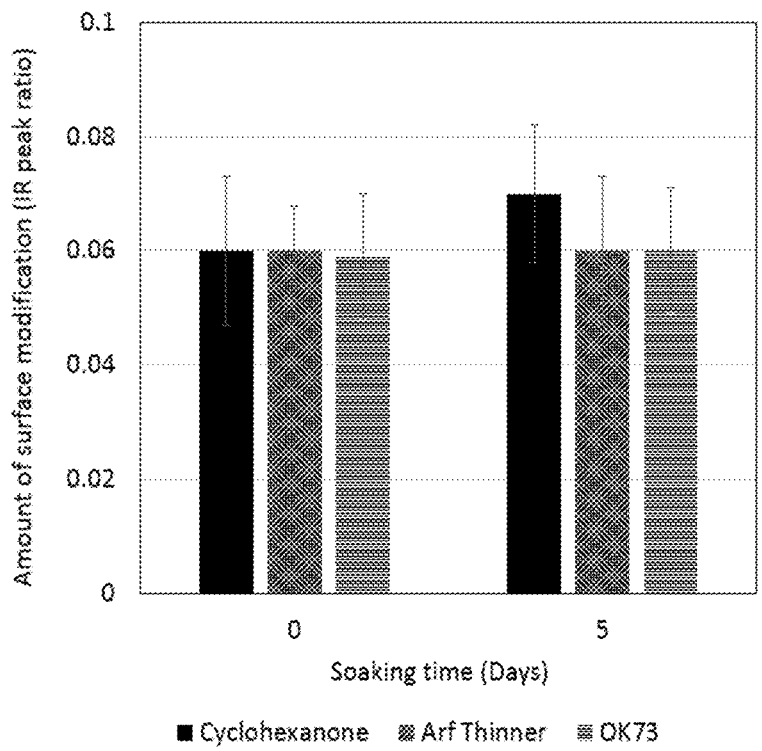
FIG. 7 shows data relating to stability of a polyamide coating upon exposure a common photoresist solvent

Samples of UPE coated Polyamide membrane were soaked in Cyclohexanone, OK73 and ArF thinner (PGMEA 45-55%, HBM 35-45%, EL 5-15%) for a period of 5 days. The amount of Polyamide on the membrane surface at time 0 and after 5 days of soaking in the organic solvent was determined by ATR-FTIR ("ATR") spectroscopy in the form of a peak ratio as described in Example 8. As depicted in FIG. 7, the amount of Polyamide coated on the membrane surface was essentially the same before and after soaking.

Example #11

This example provides a comparison of concentrations of Benzophenone in coating formulations.

Figure 8:
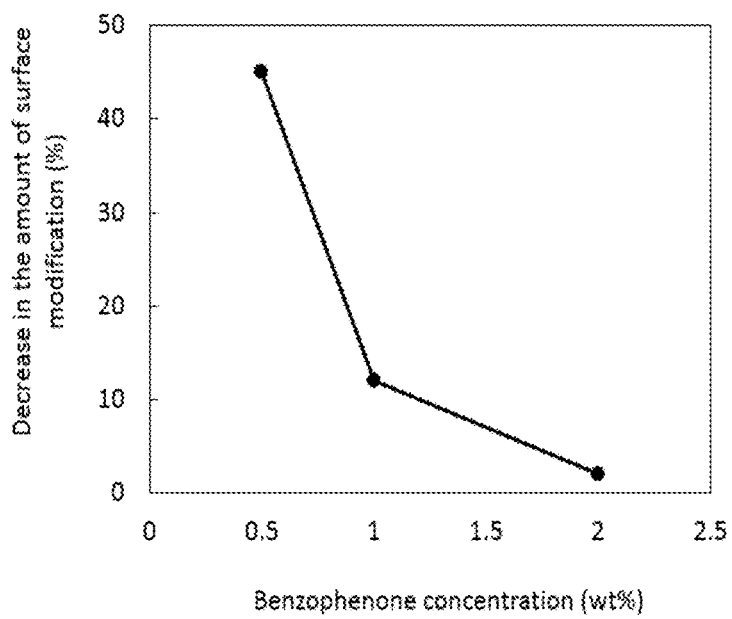
FIG. 8 shows data relating to coatings with varied amounts of photoinitiator.

A 47 mm coupon of UPE membrane (HFE mean bubble point of 80 psi) was coated with Polyamide according to the process described in Example 3 using a concentration of 3 wt % Ultramid1C and 0.5, 1, or 2 wt % Benzophenone. After emerging from the UV unit, the membrane coupons were removed from the Polyethylene sheets sandwich and immediately placed in soxhlet extractor containing 100% Isopropanol. The extraction took place over a period of 24 hours. The amount of Polyamide on the membrane surface at time 0 and after extraction in Isopropanol was determined by ATR-FTIR ("ATR") spectroscopy in the form of a peak ratio as described in Example 8. As depicted in FIG. 8, the amount of Polyamide coated on the membrane surface decreased by about 45, 12 and 2% at the respective Benzophenone concentration of 0.5, 1 and 2 wt %.

Example #12

This example demonstrates the reduced on wafer defect count obtained when a lithography solution was filtered through a filtration device comprising a membrane (UPE, 100 psi HFE mean bubble point) coated according to the process described in Example 3.

Figure 9:
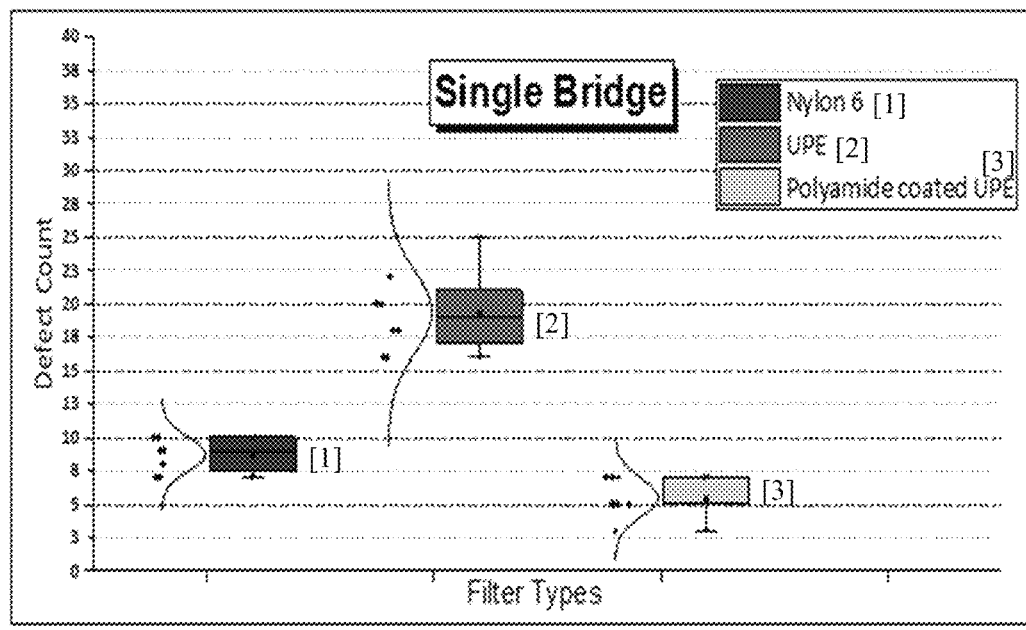
FIG. 9 shows data relating to defect count for different filter membranes.

Filter device was primed in TOK OK-73 solvent (PGME: PGMEA 70:30) and flushed with 6 liters of the solvent. Lithography work was ran in an ASML 1970i with 1.35NA and a TEL LITHIUS Pro-Zi track coat-develop System. A mask with solely L45P100 patterns and full field exposure was used for defectivity study. Material PT-CAR AIM5484 (JSR) coated on ARC-29SR-309 (BSI) was used for the patterned defect study. Bare silicon wafers are coated with PT-CAR (AIM5484) resist on ARC (ARC-29SR-309). Wafers are exposed with a mask properties L45P100 patterns on full field exposure. Patterned wafers were measured on the KLA2925 using standard recipe. Defects were reviewed with the KLA eDR-7100 and classified As depicted in FIG. 9, The UPE membrane coated with Polyamide showed the lowest defect count (best performance) with 6±1 compared to 9±1 and 20±1 for Nylon 6 (60 psi HFE mean bubble point) and UPE membrane (100 psi HFE mean bubble point) respectively.

Example #13

Solvent Filtration Example to Remove Metal Contaminants

UPE membrane (HFE mean bubble point of 80 psi) was coated with Polyamide according to the process described in Example 3 and cut into 47 mm membrane coupons. These membrane coupons were conditioned by washing several times with 10% HCl followed by soaking in 10% HCl overnight and equilibrated with deionized water. For each sample, one 47 mm membrane coupon was secured into a clean PFA 47 mm Single Stage Filter Assembly (Savillex). The membrane and filter assembly were flushed with IPA followed by application solvent. The application solvent was PGMEA. The application solvent was spiked with CONOSTAN Oil Analysis Standard S-21 (SCP Science) at a target concentration of 5 ppb of each metal. To determine the filtration metal removal efficiency the metal spiked application solvents were passed through the corresponding 47 mm filter assembly containing each filter at 10 mL/min and the filtrate was collected into a clean PFA jar at 100 mL, 150 mL, and 200 mL. The metal concentration for the metal spiked application solvent and each filtrate sample was determined using ICP-MS.

Figure 10:
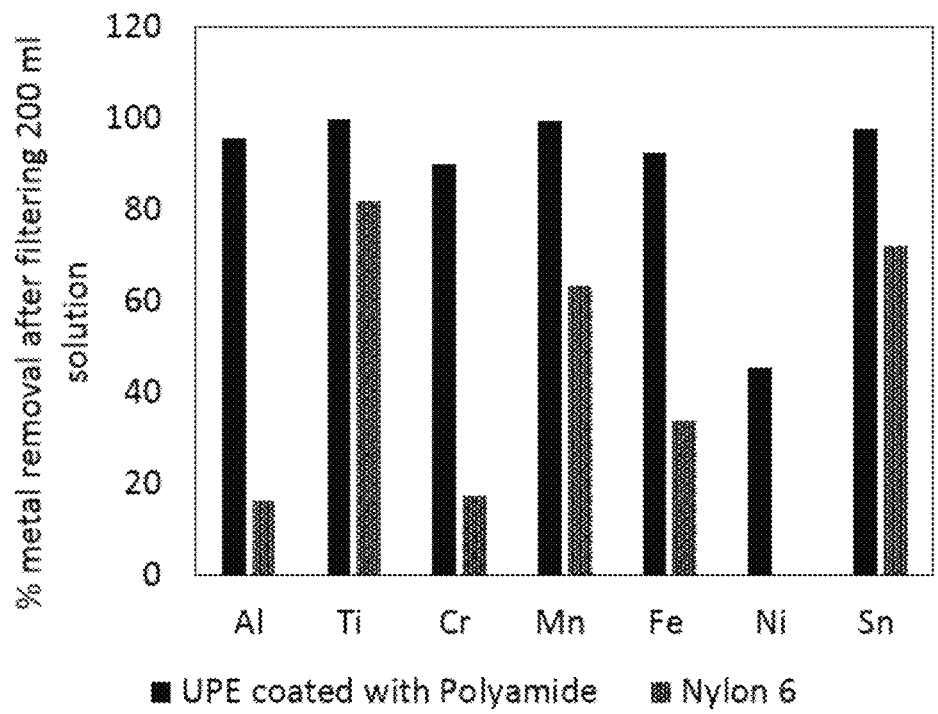
FIG. 10 shows data for metal removal efficiency for different filter membranes.

The results are depicted with a comparison to Nylon 6 membrane (HFE mean bubble point of 62 psi, conditioned in 0.35% HCl) in Total Metals Removal (%) in Table 1 and Individual Metal Removal % at 200 mL Filtration in FIG. 10 (PGMEA). The UPE membrane with polyamide coating has metal removal efficiency comparable to Nylon 6 membrane. However, the UPE membrane coated with polyamide shows improved Individual Metal Removal for at least Al, Ti, Cr, Mn, Fe, Ni, and Sn, when compared to Nylon 6 membrane.

TABLE 1

| Application Solvent | UPE coated with Polyamide PGMEA | | | Nylon 6 | | |
|---|---|---|---|---|---|---|
| Filtration Volume (mL) | 0 | 150 | 200 | 100 | 150 | 200 |
| Total Metals Removal (%) | 68 | 64 | 62 | 71 | 62 | 60 |

The invention claimed is:

1. A coated filter membrane comprising:
   a porous polymeric filter layer,
   a crosslinked polyamide film coating surfaces of the porous polymeric filter layer, wherein the crosslinked polyamide film comprises a coagulated polyamide polymer that is soluble in a solvent other than formic acid or calcium chloride and is crosslinked on the polymeric filter layer with a free radical source material, and
   residual free radical source material;
   wherein the porous polymeric filter layer comprises a polyolefin, a polyhaloolefin, a polyimide, a polyetherimide, a polysulfone, a polyethersulfone, a polycarbonate, or a fluoropolymer and is a microporous filter membrane or an ultraporous filter membrane having a pore size in a range of from 0.001 to 10 microns, wherein the coated filter membrane is liquid permeable.

2. The coated filter membrane of claim 1, wherein the coagulated polyamide polymer comprises a backbone having a cyclic linkage.

3. The coated filter membrane of claim 2, wherein the cyclic linkage is a di-cyclohexenyl linkage.

4. The coated filter membrane of claim 1, wherein the coagulated polyamide polymer is derived from a linear monomer selected from caprolactam, and hexamethylenediamine adipate, and non-linear monomer selected from a cyclic reactive compound and a di-cyclic reactive compound.

5. The coated filter membrane of claim 4, wherein the non-linear monomer is 4,4-diamino-dicyclohexylmethane adipate.

6. The coated filter membrane of claim 1, wherein the membrane has a dye-binding capacity for methylene blue dye of at least 0.2 micrograms per milligram of the membrane.

7. The coated filter membrane of claim 1, wherein the porous polymeric filter layer has a porosity of from 50 percent to 98 percent.

8. The coated filter membrane of claim 1, wherein the porous polymeric filter layer is an ultraporous filter membrane having a pore size in a range from 0.001 to 0.05 microns.

9. The coated filter membrane of claim 1 having bubble point in a range from 2 to 400 psi, measured using HFE 7200, at a temperature of 20-25 degrees Celsius.

10. The coated filter membrane of claim 1, wherein the porous polymeric filter layer has a thickness in a range from 5 to 100 microns.

11. The coated filter membrane of claim 1, wherein the porous polymeric filter layer comprises a polymer selected from polyethylene and polypropylene.

12. The coated filter membrane of claim 1, wherein the porous polymeric filter layer is ultra high molecular weight polypropylene.

13. The coated filter membrane of claim 1, wherein the crosslinked polyamide film is resistant to propylene glycol methyl ether (PGME), propylene glycol methylether acetate (PGMEA), or cyclohexanone.

14. A filter cartridge that includes the membrane of claim 1.

15. A filter that includes the membrane of claim 1.

16. A method of using the coated filter membrane of claim 1, the method comprising passing solvent-based liquid through the membrane.

17. The method of claim 16, wherein the liquid comprises solvent selected from propylene glycol methyl ether (PGME), propylene glycol methylether acetate (PGMEA), and cyclohexanone.

18. A method of preparing a coated filter membrane of claim 1, the method comprising:
   coating polymer solution onto a surface of a porous polymeric filter layer, wherein the porous polymeric filter layer comprises a polyolefin, a polyhaloolefin, a polyimide, a polyetherimide, a polysulfone, a polyethersulfone, a polycarbonate, or a fluoropolymer, the polymer solution comprising: polyamide polymer, solvent, and free-radical source material;
   causing polyamide of the polymer solution to coagulate on the surface; and
   crosslinking the polyamide, wherein the porous polymeric filter layer is a microporous filter membrane or an ultraporous filter membrane having a pore size in a range of from 0.001 to 10 microns.

19. The method of claim 18, wherein the solvent is selected from an aliphatic alcohol and a chlorinated hydrocarbon.

20. The method of claim 18, wherein the solvent is selected from methanol, ethanol, propanol, butanol, isopropanol, one or more chlorinated hydrocarbon, and combinations thereof.

21. The method of claim 18, wherein the solvent contains an amount of water.

22. The method of claim 18, wherein the solvent comprises propanol and up to 20 weight percent water based on total weight solvent.

23. The coated filter membrane of claim 1, wherein the crosslinked polyamide film coating is porous.

24. The coated filter membrane of claim 1, wherein the crosslinked polyamide film coating is non-porous.

25. The coated filter membrane of claim 1, wherein the porous polymeric filter layer is an ultrahigh molecular weight polyethylene (UPE).

* * * * *